Dec. 28, 1943.  R. C. INGERSOLL  2,337,751
METHOD OF FORMING COMPOSITE INGOTS
Filed June 21, 1940
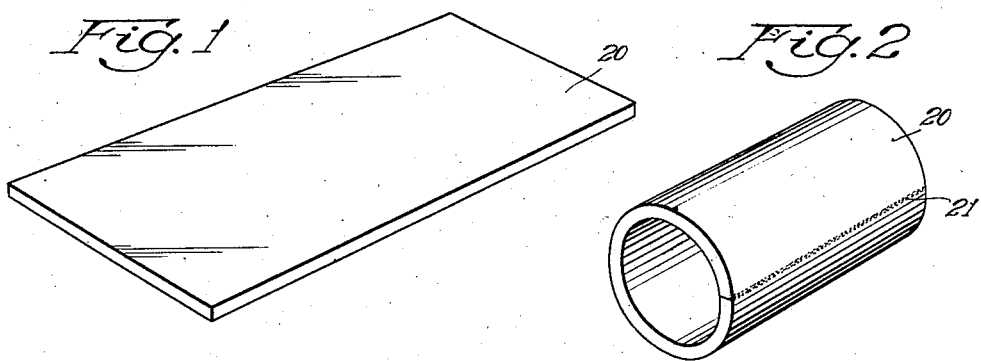
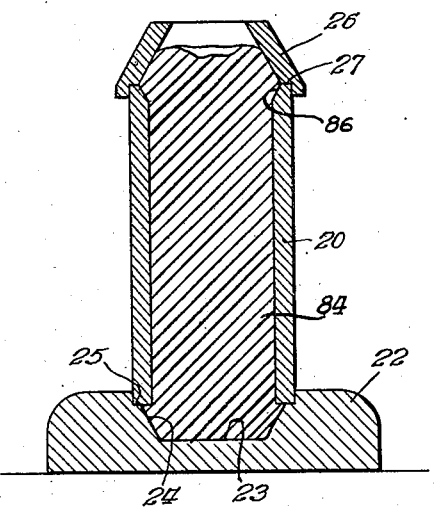
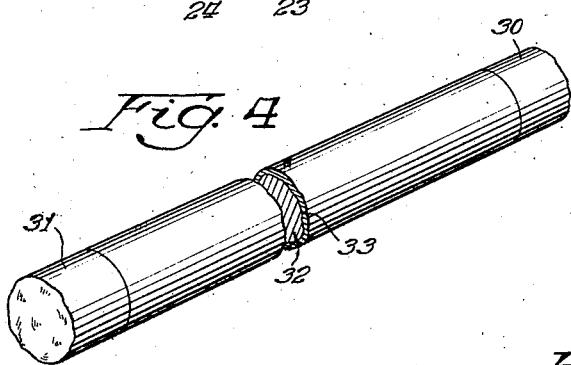
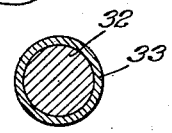
Inventor:
Roy C. Ingersoll
By Edward C. Gritzbaugh
Atty.

Patented Dec. 28, 1943

2,337,751

UNITED STATES PATENT OFFICE 2,337,751

METHOD OF FORMING COMPOSITE INGOTS

Roy C. Ingersoll, Winnetka, Ill., assignor to Borg-Warner Corporation, Chicago, Ill., a corporation of Illinois Application June 21, 1940, Serial No. 341,629

2 Claims. (Cl. 22—203)

This invention relates to metal shapes having an outer layer and an inner core of dissimilar composition and to a method of making such shapes.

There are a large number of instances where it would be desirable to use a metallic bar or pin having a central portion or core formed from a mild or low carbon steel and an outer layer of very hard or high carbon steel. In heavy duty machinery such as tractors of the caterpillar type, steam shovels, derricks, etc., it is quite important to have connecting pins for the track members which are capable of withstanding a tremendous amount of wear and yet are able to withstand the shock imparted to them by the shifting loads and uneven strains under which they are used. The customary method used to secure the kind of material required for such purposes has been to take an ordinary soft steel rod and to carburize its outer surface to produce the hard wear resistant qualities required. Carburizing however, is a long and expensive process, and where an appreciable thickness of high carbon steel is required, the amount of time necessary to obtain this carburization is very great. The amount of time consumed in the carburizing process increases very much more rapidly than the depth of carburization. It is impossible, therefore, to obtain a suitable high carbon outer layer by the carburizing process in an acceptable amount of time, nor is it possible to control the thickness of this outer layer.

The principal object of this invention is to provide an improved method of forming metal shapes having a core of one composition and a definite outer layer of another composition.

Another object of this invention is to provide steel shapes having a soft steel center core and a predetermined outer layer of high carbon steel.

Another object of this invention is to provide a method of forming soft center bars wherein the thickness of the outer high carbon layer may be readily controlled.

Another object of this invention is to provide steel shapes having a mild steel center and an outer layer of a different composition of steel intimately welded to the mild steel center.

These and other objects of this invention will become apparent from the following description when taken together with the accompanying drawing which forms a part thereof, and in which:

Fig. 1 shows a plate having a particular desired composition;

Fig. 2 shows the plate of Fig. 1 in a curled condition representing one stage in the formation of a desired shape;

Fig. 3 is a cross-section through the curled plate of Fig. 2, with the inner surface of the curled plate on an open end thereof being formed to flare outwardly, with the cross-section showing the center poured in the curled plate to form an ingot and also showing the associated pouring apparatus;

Fig. 4 shows the ingot after it is rolled; and

Fig. 5 is a cross-section through the rolled ingot.

In its preferred form, this invention comprises forming a cylinder from a sheet of metal having the desired composition for the outer surface of the finished bar, inserting molten soft steel into the cylinder so formed, and utilizing the difference in shrinkage rate between the soft center and the outer shell to form a tight seal between the poured center and shell whereby to prevent air from entering between the center and shell and oxidizing these surfaces. The ingot so formed is then heated and rolled to the desired diameter, the rolling operation serving to weld the outer shell and core together.

If desired, the abutting edges of the soft center and the outer shell may be welded together to improve the seal.

The methods herein disclosed are based upon the method disclosed in S. L. Ingersoll Patent No. 1,983,760, and are an improvement thereon. In order to clarify the present invention, my improved method will now be described in detail.

Fig. 1 shows a substantially rectangular plate 20 having the composition which is desired for the outer layer. This may be high carbon steel or it may be stainless steel or any other carbon or alloy analysis including nickel steel or Monel metal, or clad steel. The size and thickness of the plate are determined by the length of the ingot which may be conveniently handled by the apparatus available and by the thickness of the outer layer desired in the finished product. The plate is then curled into a cylinder as shown in Fig. 2, the abutting edges preferably, but not necessarily, being welded as at 21. The upper inner corner of the plate 20 is cut away along a curve 86, as seen in Fig. 3, for purposes hereinafter to be described, and this may be done to the plate either before or after the plate is curled into cylindrical shape, as is apparent. It will be noted that the surface 86 simply constitutes an extension of the interior cylindrical surface of the tube 20 and, like the latter surface, forms or defines a hollow between opposite sides of the surface into which a core may be poured.

The next stage of the formation of a soft center bar is shown in Fig. 3. An ingot stool 22 is provided upon which the cylinder 20 of Fig. 2 is placed. The ingot stool 22 may be made from any suitable fire resistant material such as fire brick or the like. The stool is formed with a centrally located depression 23 having sloping sides 24 and a shoulder 25. The purpose of shoulders 25 is to seat the cylinder accurately with respect to depression 23. It will be noted that shoulders 25 are narrower than the thickness of the plate forming the cylinder, and said plate accordingly overhangs the shoulders. Upon the upper end of the cylinder is placed a pouring spout 26 which is conical in form and which has an annular notch 27 on the lower side thereof. Said notch 27 is adapted to receive the upper end of the cylinder and serves accurately to locate the pouring spout on the cylinder. The pouring spout may likewise be made of fire brick or other fire resistant material.

When the cylinder, ingot stool and pouring spout are assembled as shown in Fig. 3, a quantity of soft steel 84 in a molten state is poured into the cylinder through the spout. Sufficient molten steel is poured to fill the cylinder completely and then to fill a portion of spout 26 as shown. It will be apparent from Fig. 3 that the molten steel will flow around the lower edge and surface 86 of the cylinder, and when the poured steel cools and shrinks, that portion which has flowed around the lower edge of the cylinder will shrink tightly against the cylinder and form a seal. The contour of the surface 86 is such that as the poured metal in proximity to the surface cools and contracts, it will always be in contact with the curved surface 86. Said contour is designed to compensate for longitudinal and radial contraction of the poured metal and forms a seal between the core 84 and the cylinder 20. Since the bottom portion of the poured metal is locked to the lower end of cylinder 20, all longitudinal contraction, therefore, is toward the lower end, as is apparent. These seals are relied upon to exclude oxygen from between the cylinder and mild steel to enable the two to be welded together in subsequent rolling operation without the formation of so-called "pipes," that is, unwelded spots. The edges of the core and cylinder may be welded to seal the edges; however, the seals provided by the core are such that it is possible to do without welding the edges of the poured metal and cylinder.

After the ingot has cooled sufficiently, pouring spout 26 is removed and the entire ingot is taken from stool 22. The ingot is then ready for the rolling operation.

The ingot is then reheated for rolling purposes, with the poured metal expanding both longitudinally and radially, and the upper region of the poured metal retraces its path wedging and adhering closely to surface 86. The seals both at the upper and lower ends are thus maintained, and oxygen is not admitted between the core and cylinder. The ingot is then passed through suitable rolls (not shown) until it is of the desired diameter. During the rolling operation the heat and pressure of the rolls will cause the mild steel core and the outer shell to be intimately welded over their contacting surfaces. There will be formed during the rolling operation at each end of the ingot a portion which is not surrounded by high carbon steel by reason of the fact that cylinder 20 is initially made shorter than the core. The end portions 30 and 31 are, therefore, sawed off at the point where the high carbon steel ends.

A cross-section through the finished soft center bar is shown in Fig. 5. It will be seen to comprise a central core 32 having a composition of the metal poured into the original cylinder and an outer layer 33 of predetermined thickness having the composition of the high carbon steel cylinder. Such a bar may be readily used wherever high wear resisting qualities are required to be combined with strength to resist shock.

It will be apparent that by the methods above described, soft center steel having any desired thickness of high carbon steel on the outside may be readily formed. The quality of the high quality steel is determinable to a high degree as well as the thickness of the steel. It requires no more time to form a bar having a one-eighth inch thick outer layer than it does to form a similar sized bar having a one-sixteenth inch outer layer. Such bars can be made of any desired finished diameter and can be used wherever high wear-resistance properties are required combined with ability to resist shock. Among the many uses to which such rods may be put are hinged pins, shafting, drill rods, piston rods, pump rods, clench pins, wrist pins, pins for chains and caterpillar shoes, etc.

It is understood that the foregoing description is merely illustrative of a preferred embodiment of my invention and the scope of the invention, therefore, is not to be limited thereto, but is to be determined by the appended claims.

I claim:

1. The method of forming a composite ingot having an outer layer of one composition and a core of a different composition, said method comprising; curling a sheet bar into a tube, the sheet bar having the composition desired for the outer layer; forming a tapered interior core seating surface at one end of the tube on a taper such as to accommodate the entire axial shrinkage of a core having one end portion overhanging and bearing against said seating surface and having its opposite end portion overhanging and bearing against the opposite end of the tube, without causing rupture of the core, the taper of said surface furthermore being of such a degree that the end portion of the core in contact therewith will develop substantially the contour of said surface as a result of the combined effects of radial and axial shrinkage, and at the same time will develop axial pressure of said end portion against said interior seating surface; pouring molten material of the said desired core composition into the tube in a manner such as to cause said molten material to flow around said opposite end of the tube and to completely fill the tube including the space defined within said tapered load bearing surface, and permitting the core to cool so as to undergo said axial shrinkage, whereby to contract the end portions of the core against said seating surfaces and thereby form an air-tight seal between the core and the tube.

2. The method of forming a relatively long and narrow composite ingot having an outer layer of one composition and a core of a different composition, comprising forming a tube having the composition of the outer layer, forming said tube with core seating surfaces in the respective end regions of the tube arranged to resist the thrust of the respective end portions of said core under longitudinal contraction of the core, at least one of said surfaces comprising a tapered interior surface of the tube, diverging toward the coacting end portion of the core with a contour which is developed by the contracting surface of the core material under radial and axial shrinkage thereof whereby to avoid rupture of the core during cooling shrinkage while maintaining an air-tight seal between the core and tube, inserting molten material of the desired core composition into the tube so as to form a tube having end portions overhanging and adapted to contract against said seating surfaces during cooling shrinkage, and thereafter permitting the core to cool so as to undergo such shrinkage.

ROY C. INGERSOLL.